United States Patent Office 2,718,368
Patented Sept. 20, 1955

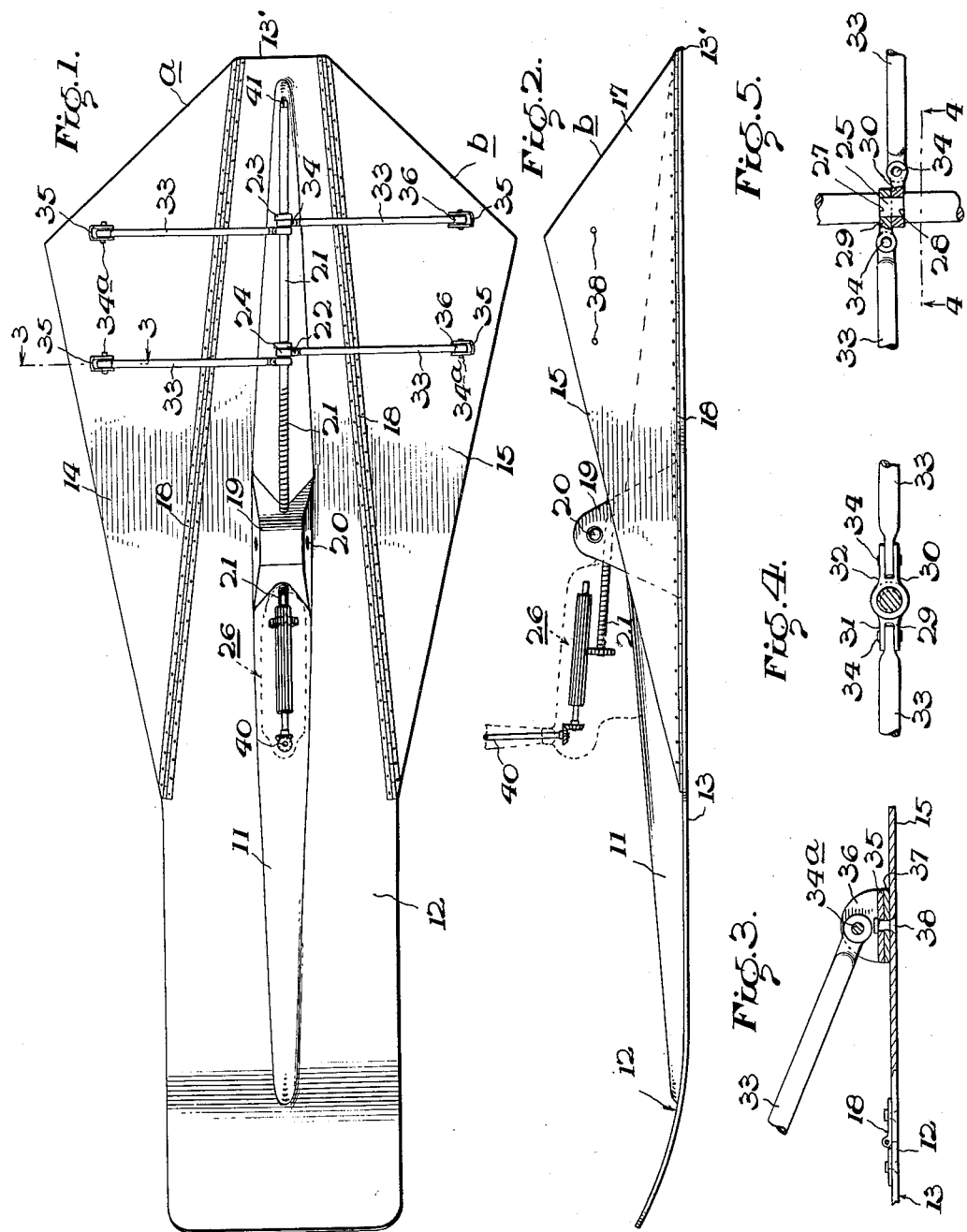

2,718,368
PLANING SURFACES FOR AIRCRAFT

Donald B. Doolittle, Wilmington, Del., assignor to All American Engineering Company, Inc., Wilmington, Del., a corporation of Delaware Application April 8, 1953, Serial No. 347,479

3 Claims. (Cl. 244—105)

This invention is a continuation-in-part of prior copending application Serial Number 142,654, filed February 6, 1950, now United States Patent No. 2,647,709, for "Planing Surface For Aircraft and Hydrocraft." The foregoing application has proven after repeated tests to be very efficient and satisfactory in performance for safe landings on various surface mediums, as water, mud, grass or any combinations of these mediums. However, it has been discovered that landings on rough water may be improved and made with greater safety by converging or streamlining the planing surface of the landing gear at the heel or tail end thereof toward a central point. For example, when an aircraft equipped with planing surface landing gear makes a touch down on rough water the converged ends of the planing members will cut into the water on first impact and then lift into planing position on the water surface by the forward landing speed of the craft. Then as the landing speed is reduced the pilot lowers the planing flaps to maintain planing sustenation on the water surface at relatively slow surface landing speeds. Such low speeds are impossible and unsafe without the variable area planing members, and such high speed landings being unsafe except with planing members having the very narrow planing surfaces provided by the converging or streamlined heel sections of the members.

Accordingly an object of this invention is to provide for safe landings on rough water by high speed craft with non-buoyant streamlined planing members.

And another object is to provide for safe operation of aircraft with non-buoyant planing members at slow surface taxiing or landing speeds after a high speed landing with said planing members.

Yet another object is to provide streamlined variable area planing members having a high speed rough water planing surface and a pilot controlled slow speed planing member cooperatively connected thereto.

Other objects and advantages of the present invention will appear from the following detailed description, which refers by reference numerals to the several similarly numbered parts of the attached drawing embodying one form of the invention.

In the drawing:

Fig. 1 is a top plan view of a rough water planing member with the pilot controlled side planing members lowered into planing position for slow surface planing speeds;

Fig. 2 is a side view in elevation showing the pilot controlled side planing members raised with only the central rough water planing surface adapted to be used for a high speed landing on the narrow converging rear portion;

Fig. 3 is a partial cross section view taken transversely of one of the slow speed pilot controlled planing surface actuator shafts and its connection to one of the said surfaces;

Fig. 4 is a partial cross section view taken transversely of the pilot controlled planing surface actuator shaft and its connecting rods or links coupled to the part shown in Fig. 3 taken on line 4—4 of Fig. 5; and Fig. 5 is a top view of the said actuator shaft partly in cross section and partly in top elevation.

Referring in detail to the drawing and first with particular reference to Fig. 1, there is illustrated a top plan view of a planning member 12 with a reinforcing rib 11 along its top section. The planing member comprises a planing surface 13 shaped to adapt it to land safely on rough water at high speeds. For example, the member 12 is streamlined, that is, gradually tapered toward a central point along the longitudinal axis of the member, to thereby provide a rearwardly converging planing surface 13' at the rear or heel of the planing member. Thus when an aircraft equipped with landing gear having planing members such as 12 surfaces on rough water the pitch of the members is such as to toe up the members and thereby cause the converged or streamlined planing surface 13' to cut into the waves and prevent excessive impact on the water surface to minimize landing shock and possible breakage at high speeds.

After touchdown the forward speed of the landing craft in cooperation with the planing surfaces provides lift even on the narrowest cross sectional area of the streamlined rear planing surface 13'.

As the airplane surface planing speed is reduced the pitch of the members 12 changes until more of the planing surface contacts the water surface. When the surface planing speed is reduced to a relatively slow motion the pilot by suitable means lowers side sections 14 and 15 having auxiliary planing surfaces 16 and 17, respectively. Each auxiliary planing surface is a slow speed planing surface permitting the airplane to approach an almost zero speed without sinking and each surface is preferably pivotally secured along each longitudinal edge of the high speed planing member 12 by suitable means, such as the elongated hinge 18. Thus when the side sections are lowered the auxiliary planing surfaces provide a continuing planing surface of relatively larger area for greater sustaining action on the water surface at slow speed as shown in Fig. 1.

Prior to landing on a surface medium, such as a rough water surface the sections 14 and 15 are folded upward and over the top of high speed planing surface 12, see Fig. 2. With the sections folded over in this manner there also is less air resistance in flight, particularly due to the streamlined shape of the cooperating planing surfaces.

The central reinforcing rib 11 of the hydro-ski is formed with a pyramidal axle mounting 19. The axle mounting 19 has a through transverse opening 20 for receiving the axle of the aircraft undercarriage, to thereby mount the ski for use. The axle mounting of each pair of hydro-skis used serves as an operating base for the thread end 21 of an actuating rod 22.

The threaded end 21 of the actuating rod 22 threads completely through the axle mounting 19 in a threaded opening formed therein below and at right angles to the axle opening 20 and the unthreaded end of the rod is slidable through guide fittings 23 and 24 on top of the rib 11. The sliding action of the rod 22 caused by the threading in and out of the same in the axle mounting may be driven by any suitable power means, such as the gear train 26 and electrically or hydromatically driven shaft arrangement shown in Figs. 1 and 2.

The actuating shaft 22 is formed with spaced apart short sections 25 of reduced diameter, thereby providing oppositely facing shoulders 27 and 28. Loosely encircling each reduced section 25 are pairs of connections 29 and 30 with apertured bifurcated ends 31 and 32. Each pair of connections have their respective bifurcated ends 31 and 32 extending radially from the rod 22 in opposite directions and pivotally connect with the apertured end of a link arm 33. When the bifurcated ends are coupled to a link arm 33 by suitable means, such as a vertical rivet or pin 34, see Figs. 4 and 5, care is had to have the actuating rod 22 positioned on the rib 11 so that each set of connections 29 and 30 are on the inner or leading side of the fittings 23 and 24 respectively. When thus positioned the fittings serve as limit stops to control the axial thrust of the actuating rod 22 when the flap sections 14 and 15 are unfolded as will be more fully explained hereinafter.

There are similar link arms 33 connected to each one of the bifurcated ends of the connections 29 and 30. As shown in Fig. 2 these links extend from each side of the actuating rod 22, and each of their extended ends are pivotally coupled by a pin 34ᵃ to a swivel bushing 35 formed with upstanding spaced apart apertured ears 36 through which the pin 34ᵃ extends, see Fig. 3. Each of the bushings 35 have a base formed with a central opening mounted on a bearing plate 37 also with an opening aligned with the opening in the bushing base. Each swivel bushing 35 and the bearing plate 37 are secured together by a headed rivet 38 riveted to the stop surface of their respective foldable ski section or flap 14 and 15, so the bushing 35 is free to swivel or turn on bearing plate 37 when the actuating rod 22 is pulled forward with the arms 33 to raise or fold the side sections or flaps 14 and 15. As shown these side flaps are of triangular shape to thereby merge with the leading end of the ski body 10. Also the tail end of the sections 14 and 15 are angled inwardly along their trailing outboard edges *a* and *b* so as to merge into the end of the streamlined surface 13'.

Operation

The variable planing surfaces of the hydro-skis are controlled from the pilot's seat by any suitable control means, not shown. This control means imparts power through shaft 40 and gear train 26 to drive the actuating rod 22, see Figs. 1 and 2.

When landing a plane equipped with hydro-skis on water the pilot maintains a taxiing speed as low or high as necessary to keep afloat. The more planing surface area provided the slower the taxiing speed may be and accordingly as the aircraft is slowed down the pilot may unfold the flaps 14 and 15 to increase the planing surface and thus compensate for reducing taxiing speeds.

When the flaps 14 and 15 are folded as in Fig. 1, the actuating rod 22 is positioned forward from the trailing end of the rib 11 and the connecting links 33 are angularly directed toward the axle mount 19. This position of the links is permitted because of the swivel bushing 35 and the pivoted connection of each link 33 on a pin 34. The forward movement is stopped by suitable means such as enlarged nut 41 on the end of shaft 22.

As power is applied to the actuating rod 22 through gear train 26, for example, the thread section 21 moves axially toward the trailing end of the hydro-ski 10 and turns the links 33 on their respective pivot pins 34, until the connections 29—30 and 31—32 abut against the actuator shaft or rod guides 23 and 24 respectively. During the rearward sliding movement of the actuator rod 22 the links 33 impart power to unfold the flaps or side sections 14 and 15 to the substantially aligned position shown in Fig. 2 for maximum area planing surface for minimum low taxi speeds.

As previously explained when landing at high speeds with jet or other aircraft equipped with planing surfaces or on rough water the sections 14 and 15 are folded so the streamlined or converging planing member 12 only is used for initial touchdown to relieve water surface shock impact by cutting through the waves and until the aircraft landing surface speed is reduced, the side sections are kept folded.

Thus we have provided a novel undercarriage arrangement including hydro-skis for airplanes, which replace the usual landing wheels or pontoons and have many advantages thereover. For example, a craft equipped with hydro-skis is superior to an aircraft equipped with wheels due to the reduced drag of the ski configuration. Also, when taking off from water, acceleration from taxiing speed to take-off is materially more rapid than with conventional floats and there is much less spray and water disturbance when using hydro-skis. Then also hydro-skis permit landing on any surface, which is not possible with conventional landing gear.

Without further description it is believed that the foregoing is sufficiently complete, clear, concise and exact in terms to enable any person skilled in the art to practice our invention. However, it is to be expressly understood that although only one form of our invention is described and illustrated in detail, that other parts, arrangements and combinations of parts, which may now occur to others are likewise intended to be covered hereby. To determine the scope of our invention reference should be had to the appended claims.

I claim:

1. Streamlined planing means for aircraft comprising a main member having a streamlined planing surface section, auxiliary planing surfaces pivotally connected to the main planing member adjacent each outboard edge of said streamlined surface, and control means for raising and lowering said auxiliary surfaces.

2. The planing means described in claim 1, wherein the auxiliary planing surfaces converge rearwardly along their outboard edges, to thereby merge into the end of the said streamlined main member.

3. As an article of manufacture a planing member for interchangeable connection with the axle of conventional aircraft landing gear, said member having a planing surface, said planing surface having portions differing in plan form therefrom and each portion converging along each outboard edge toward an apex common to both, and axle connecting means carried by the member.

References Cited in the file of this patent

UNITED STATES PATENTS

| | | |
|---|---|---|
| D. 170,194 | Green | Aug. 18, 1953 |
| 2,410,702 | Arsenault | Nov. 5, 1946 |
| 2,539,817 | Ditter | Jan. 30, 1951 |
| 2,625,350 | Ditter | Jan. 13, 1953 |
| 2,646,235 | Dawson | July 21, 1953 |

FOREIGN PATENTS

| | | |
|---|---|---|
| 448,581 | Great Britain | June 11, 1936 |